March 11, 1952 C. BELLIOS 2,588,474
FILTER FOR INTERNAL-COMBUSTION ENGINES
Filed Oct. 19, 1948 2 SHEETS—SHEET 1
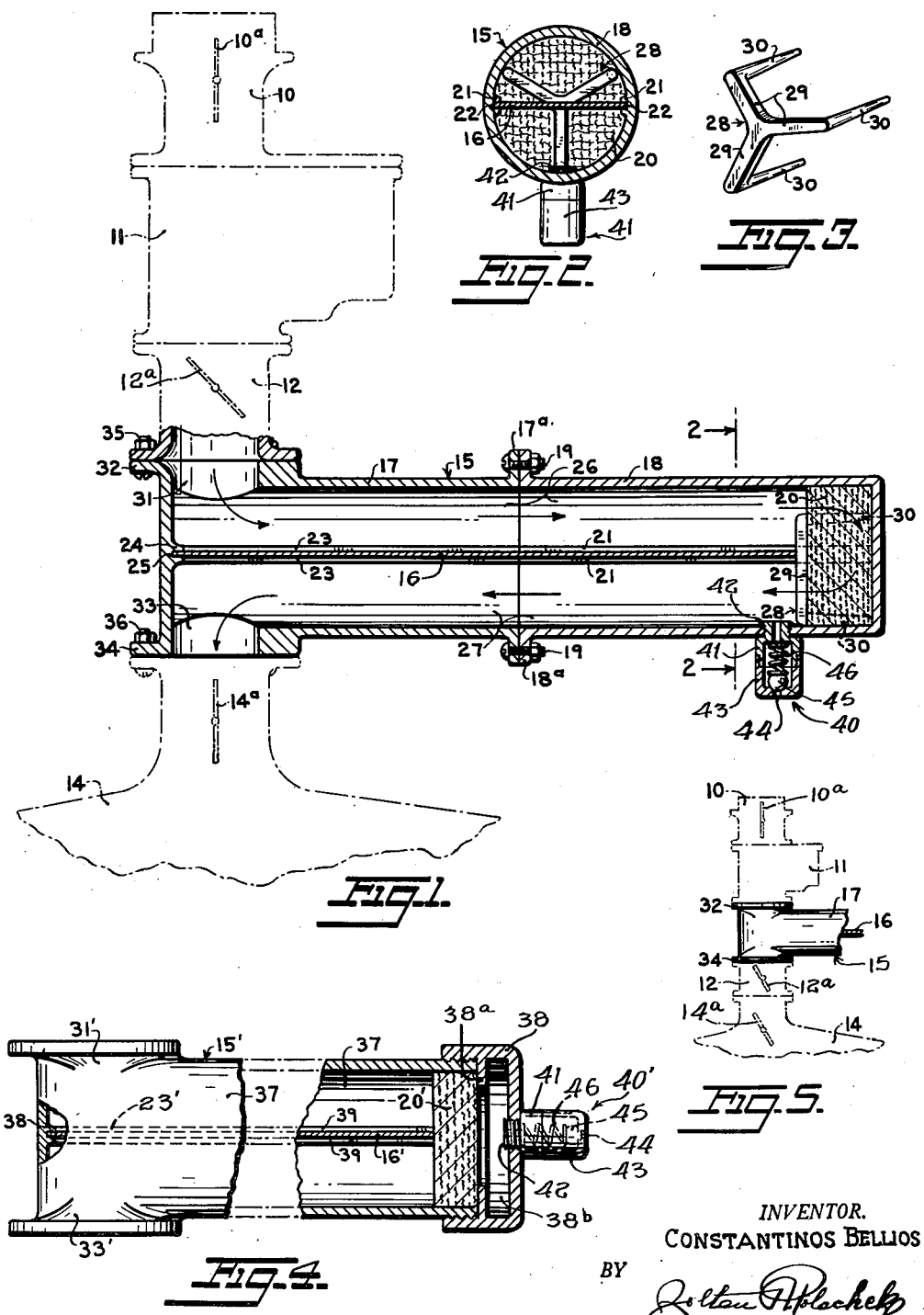
INVENTOR.
CONSTANTINOS BELLIOS March 11, 1952        C. BELLIOS        2,588,474
FILTER FOR INTERNAL-COMBUSTION ENGINES
Filed Oct. 19, 1948        2 SHEETS—SHEET 2
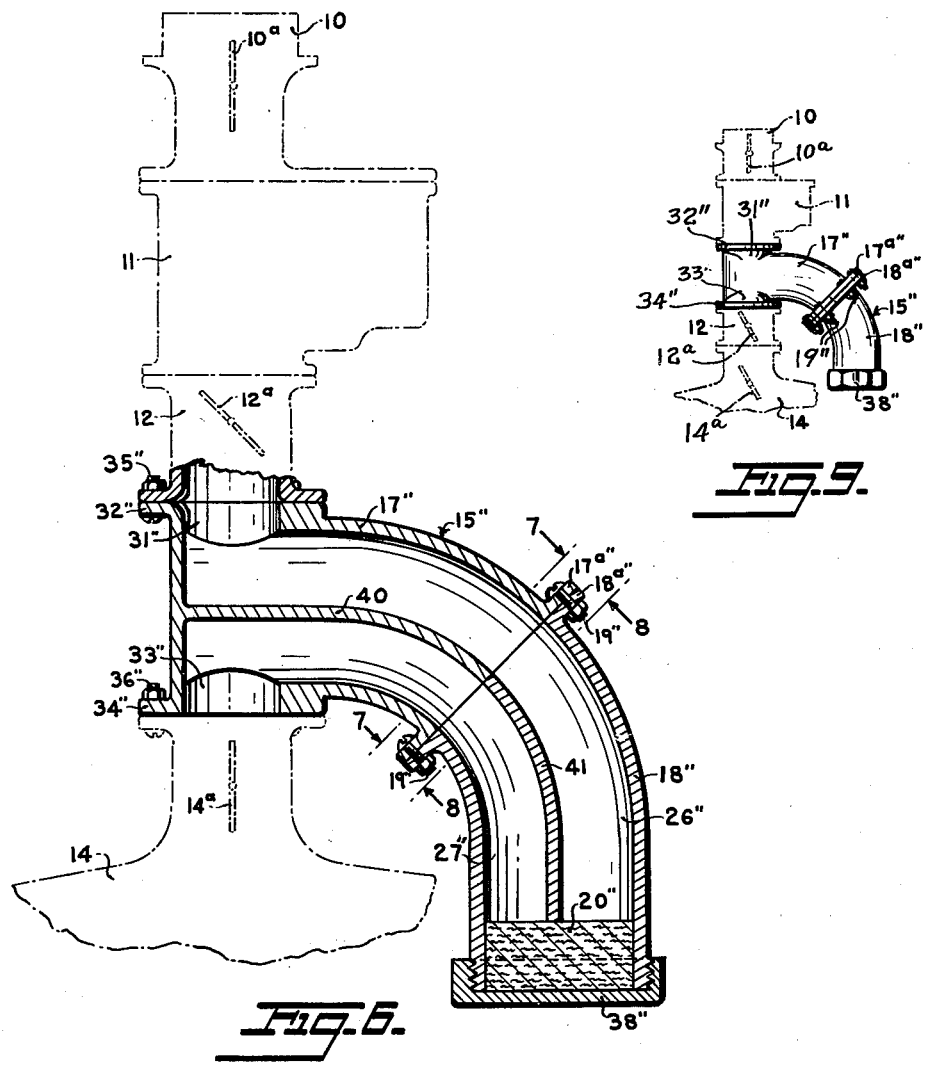
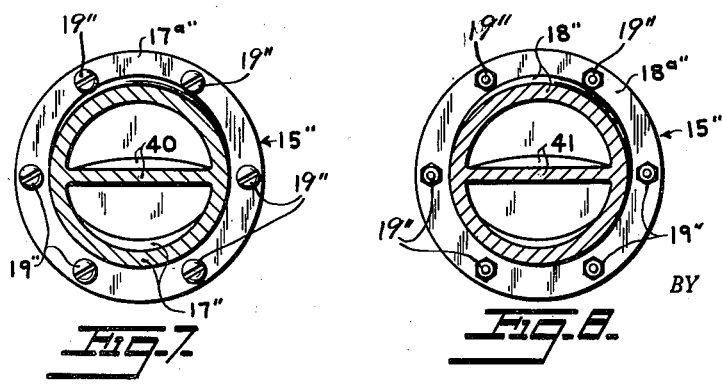
INVENTOR.
CONSTANTINOS BELLIOS
BY
ATTORNEY Patented Mar. 11, 1952

2,588,474

UNITED STATES PATENT OFFICE 2,588,474

FILTER FOR INTERNAL-COMBUSTION ENGINES

Constantinos Bellios, Brooklyn, N. Y.

Application October 19, 1948, Serial No. 55,255

4 Claims. (Cl. 48—180)

This invention relates broadly to new and useful improvements in internal combustion engines, and, more particularly, the aim is to provide a novel and valuable device for operative association with a carburetor in such manner that before the mixture of air and a hydrocarbon fuel gas drawn from the carburetor by the suction of an engine cylinder during its intake stroke reaches the intake manifold of the engine, such mixture is subjected to a greater suction than would otherwise be possible and at the same time subjected to a scrubbing and filtering action.

A feature of the invention is the provision by said auxiliary device of a special chamber in the form of a relatively long and preferably tortuous passage, as one of U-extension, through which said mixture must pass.

A further feature of the invention is the placement in said passage of a filter means for the mixture, with this means located intermediate the ends of said passage, and, where the passage is of U-shaped extension as above, at what may be called the bowl of the U, that is, where there is a preferably sharp change in the direction of travel of the mixture through said special chamber.

Another object of the present invention proposes the provision of a one-way inlet valve along the length of the tortuous passage for connecting the passage with the atmosphere and arranged to be opened when a partial vacuum is created within the passage in a manner to permit outside air to enter the passage and relieve the vacuum.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a view showing in central longitudinal section one now approved embodiment of the new device, with the same in one possible operative relation to a conventional carburetor various familiar components of which are indicated in dot and dash lines.

Fig. 2 is a transverse section, taken on the line 2—2 of Fig. 1.

Fig. 3 is a perspective view of a fitment which in the use of certain types of filter means may desirably be present.

Fig. 4 is a view, partially in elevation and partially in central longitudinal section, showing a modification of the new device of Fig. 1.

Fig. 5 is a view similar to Fig. 1, but on a reduced scale, showing the new device, embodied either as in Fig. 1 or as in Fig. 4, in another possible operative relation to the carburetor.

Fig. 6 is also a view similar to Fig. 1, and drawn to the same scale as in Fig. 1, but showing another now favored embodiment of the invention.

Fig. 7 is a transverse section taken on the line 7—7 of Fig. 6

Fig. 8 is a transverse section taken on the line 8—8 of Fig. 6.

Fig. 9 is a view similar to Fig. 5, but showing the new device as embodied in Fig. 6 in another possible operative relation to the carburetor.

Referring to the drawings in detail, in Figs. 1, 5, 6 and 9 the carburetor conventionally indicated in dot and dash lines is shown, in accordance with the design of most modern carburetors, as comprising three separable sections; these being an air inlet connection 10 having the familiar choke valve 10$^a$, a central main body section 11 in which the air and fuel are mixed, and a mixture outlet section 12 having the familiar throttle valve 12$^a$. The section 10 leads from a suitable air scoop not shown, and the section 12 leads to a suitable intake manifold, such as indicated at 14, and having the usual butterfly valve 14$^a$.

The new device, as embodied in Figs. 1–3, and marked as whole 15, is illustrated as in the form of an elongate cylindrical casing structure having a central longitudinal partition 16. Said casing is shown, for example, as in two separable sections 17 and 18 having matching external annular flanges 17$^a$ and 17$^b$ to be tightly coupled by a suitable plurality of bolts 19.

The partition 16 is continuous longitudinally of both said section 17 and 18, from the very end of the section 17 remote from its flange 17$^a$, to a point spaced somewhat from the end of the section 18 remote from its flange 18$^a$. This spacing is to provide a compartment within which a suitable filter means 20 may be positioned. This filter, which may be of any appropriate type, is illustrated as a mass of fibrous material.

For holding the partition 16 in place, the section 18 along each of its opposite sides is provided with an internal longitudinally extending rib 21 carrying a groove 22 centrally thereof and almost as long as the rib. The section 17 along each of its opposite sides is provided with an internal longitudinally extending rib carrying centrally thereof and along the entirety of its length a groove like one of the grooves 22 and alignable therewith. One of the two last-mentioned ribs is indicated at 23. The rib 23 and the oppositely disposed similar rib in the section 17 are joined by a laterally extending rib 24 carrying centrally thereof and all along its length a groove 25. This groove 25 is in the same plane with the two other grooves in the section 17, that is, with the groove along the rib 23 and with the groove along the rib opposite to said rib 23. The apertures of the flanges 17ᵃ and 18ᵃ through which the bolts 19 are to be applied are so positioned that when the apertures of one of said flanges match the apertures of the other, the two grooves 22 in the section 18 are in the same plane with the grooves respectively carried by the rib 13 and its companion rib in the section 17.

Thus, with all these five grooves of a width substantially equal to the thickness of the partition 16, the latter may be fully slid into the section 17, then the flanged end of the section 18 may be advanced toward and for groove engagement with the end of the partition 16 protruded from the section 17, and said section 18 may be further moved toward the section 17 to cause abutment of the flanges 17ᵃ and 18ᵃ; thereby tightly to mount the partition 16 in and longitudinally of the device 15, to provide a passageway 26 leading to the compartment for the filter 20 and a passageway 27 leading away from such compartment.

For holding the filter 20 in place, and at the same time for restraining the partition 16 against endwise shift out of the groove 25, where such filter is of loosely packed fibrous material, a skeletal fitment 28 is provided. As shown best in Fig. 3, such fitment incorporates a three-armed spider portion 29 and three legs 30, said legs being spaced 120° apart, with each leg offset from the outer end of a different arm of said spider portion perpendicularly to the general plane of the latter. As will be understood, before the sections 17 and 18 are assembled as above about the partition 16, then for application of the bolts 19, the filter 20 and the fitment 28 are placed in the outer end of the section 18. The end of the partition 16 adjacent the fitment 28 has its center portion shaped to engage about the adjacent portion of the fitment 28 so that the end of the partition may engage the adjacent face of the filter 20.

The section 17, at its end remote from its flange, and above the situs of the partition 16, is shaped to include an upstanding neck 31 topped by an external annular flange 32; and said section 17, opposite to the neck 31, and below the situs of the partition 16, is shaped to include a depending neck 32 bottomed by an external annular flange 33.

One possible operative relation of the device 15 to the carburetor is illustrated in Fig. 1, where, as will be observed, said device is interposed between the carburetor's mixture outlet section 12 and the engine's intake manifold 14; and there secured as by means of a plurality of bolts or the like as indicated at 35 and as by means of a plurality of bolts or the like as indicated at 36.

Mounted on the cylindrical casing 15 on one side of the partition 16 there is a one-way inlet valve 40. The valve 40 is located on the casing to communicate with the portion of the interior passage between the filter 20 and the intake manifold 14 of the engine.

The one-way inlet valve 40 is composed of an inner body section 41 formed with a tubular threaded bushing 42 threaded into the side of the cylindrical casing 15. An outer body section 43 is threadedly connected with the inner body section 41 and is formed with an inlet opening 44 which communicates with the atmosphere. The inlet opening 44 is closed by a ball 45 which is retained in an operative position closing the opening 44, by an expansion spring 46. The expansion spring 46 operates between the ball 45 and the end wall of the inner body section 41.

When the operation of the motor creates a partial vacuum in the portion of the passage between the filter 20 and the intake manifold 14, the pressure of the outside atmosphere will disengage the ball 45 from the inlet opening 44 against the holding pressure of the expansion spring 46 and permit the outside atmosphere to enter the passage until the partial vacuum is relieved after which the expansion spring 46 will again urge the ball 45 into its operative position closing the inlet opening 44.

The new device as embodied in Fig. 4, and there marked as a whole 15', differs from the device 15 of Figs. 1 and 2, particularly in that a casing structure is provided which incorporates a single main section 37 and an end screw-cap 38, and also particularly in that the fitment 28 is omitted, as could be done even in the device 15 if the filter be of a sufficiently tightly packed fibrous nature or otherwise be somewhat resistant to depthwise deformation under moderate mechanical compressive force. At the end of the section 37 remote from its open end, said end externally threaded for taking the cap 38, there is provided an internal longitudinally grooved rib 23' corresponding to the rib 23, and along each of the opposite sides of said section 37 is an internal longitudinally grooved rib, one of which ribs is marked 39, and each of which corresponds, in function relative to the partition 16', to an alignable pair of ribs 23 and 21 respectively extending longitudinally of the sections 17 and 18 of the device 15. The filter is indicated at 20'; and flanged necks corresponding to the necks 31 and 33 are respectively indicated at 31' and 33'.

The cap 38 is screw threaded onto the end of the casing structure 15' and the filter 20' is fitted into the end of the casing structure. The interior of the cap 38 is formed with a circular flange 38ᵃ which is spaced from the end wall of the cap 38 and which bears against the outside face of the filter 20' holding the filter in position within the casing structure with its inner face engaging against the adjacent end of the partition 16. The arrangement of the flange 38ᵃ provides a space 38ᵇ within the cap 38 between the adjacent faces of the filter 20' and the end wall of the cap 38.

Mounted on the cap 38 there is a one-way inlet valve 40', similar in construction to the one-way inlet valve 40 of the previous form of the invention, arranged to connect the space 38ᵇ with the outside atmosphere when a partial vacuum is created within the passage of the device as in the previous form of the invention.

The device may be interposed, as explained above in connection with the device 15, between the carburetor's mixture outlet section 12 and the manifold 14.

In the new device as embodied in Figs. 6–8, and there marked as a whole 15'', the parts to which are applied reference numerals with double primes added correspond, respectively, to the parts to which are applied reference numerals without primes. The partition for providing the two passages 26'' and 27'' is shown at 40 as made over a part of its length integral with the section 17'' and is shown at 41 as made over the remainder of its length integral with the section 18''. Here, it will be noted, the device is of substantially L-shaped extension, with each section 17″ and 18″ having, adjacent its flange 17a″ or 18a″, a longitudinally arcuately curved end portion.

While in Fig. 6, the device 15″ is shown as interposed between the carburetor's mixture outlet section 12 and the manifold 14, in Fig. 9 the device 15″ is shown as interposed between the carburetor's central main body section 11 and its mixture outlet section 12.

The attachments of the present invention function to scrub and filter the fuel-air mixture supplied to the motor, but in addition the contained filter further serves to break up the wet fuel particles so that they blend more evenly with the air forming a more combustible fuel-air mixture.

On the drawings, the cylindrical casing is illustrated with the U-shaped extension extended horizontally or curved downward, but it is pointed out that this is by way of illustration only, as the U-shaped extension may be extended vertically upward, may be curved to extend upward or may be conformed to any other desired shape without departing from the scope and intent of the present invention.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described having an elongated tubular casing with one end closed and the other end open and provided adjacent its closed end with an entrance port for connection to an engine carburetor and diametrically opposite the entrance port with an exit port for connection to the intake manifold of an engine, a longitudinal partition positioned axially within the casing with its width extended at right angles to the axis of the ports and with one end engaged against the closed end of the casing and with its other end spaced inward of the open end of the casing, a filter fitted into the open end of the casing with its inner face abutted against the adjacent end of said partition and its outer face flush with the open end of the casing, a cap screw threaded onto the open end of the casing, an inwardly directed flange within said cap and spaced from its end wall and engaging the outer face of said filter holding it in position and engaging the open end of the casing holding the end wall of the cap spaced from the outer face of said filter.

2. In a device of the class described having an elongated tubular casing with one end closed and the other end open and provided adjacent its closed end with an entrance port for connection to an engine carburetor and diametrically opposite the entrance port with an exit port for connection to the intake manifold of an engine, a longitudinal partition positioned axially within the casing with its width extended at right angles to the axis of the ports and with one end engaged against the closed end of the casing and with its other end spaced inward of the open end of the casing, a filter fitted into the open end of the casing with its inner face abutted against the adjacent end of said partitions and its outer face flush with the open end of the casing, a cap screw threaded onto the open end of the casing, an inwardly directed flange within said cap and spaced from its end wall and engaging the outer face of said filter holding it in position and engaging the open end of the casing holding the end wall of the cap spaced from the outer face of said filter, said partition being removable mounted in position within the casing to be removed when cap and filter are removed.

3. In a device of the class described having an elongated tubular casing with one end closed and the other end open and provided adjacent its closed end with an entrance port for connection to an engine carburetor and diametrically opposite the entrance port with an exit port for connection to the intake manifold of an engine, a longitudinal partition positioned axially within the casing with its width extended at right angles to the axis of the ports and with one end engaged against the closed end of the casing and with its other end spaced inward of the open end of the casing, a filter fitted into the open end of the casing with its inner face abutted against the adjacent end of said partition and its outer face flush with the open end of the casing, a cap screw threaded onto the open end of the casing, an inwardly directed flange within said cap and spaced from its end wall and engaging the outer face of said filter holding it in position and engaging the open end of the casing holding the end wall of the cap spaced from the outer face of said filter, and a grooved rib formed along the inner faces of the sides and closed end of the tubular casing and into which said partition is slidably fitted to be removed when said cap and filter are removed.

4. In a device of the class described having an elongated tubular casing with one end closed and the other end open and provided adjacent its closed end with an entrance port for connection to an engine carburetor and diametrically opposite the entrance port with an exit port for connection to the intake manifold of an engine, a longitudinal partition positioned axially within the casing with its width extended at right angles to the axis of the ports and with one end engaged against the closed end of the casing and with its other end spaced inward of the open end of the casing, a filter fitted into the open end of the casing with its inner face abutted against the adjacent end of said partition and its outer face flush with the open end of the casing, a cap screw threaded onto the open end of the casing, an inwardly directed flange within said cap and spaced from its end wall and engaging the outer face of said filter holding it in position and engaging the open end of the casing holding the end wall of the cap spaced from the outer face of said filter, and an inlet valve mounted through the end wall of said cap to communicate with the space between the adjacent faces of said filter and the end wall of said cap.

CONSTANTINOS BELLIOS.

REFERENCES CITED

The following references are of record in the file of this patent:

UNITED STATES PATENTS

| Number | Name | Date |
| --- | --- | --- |
| 1,275,117 | Winters | Aug. 6, 1918 |
| 1,623,721 | Florey | Apr. 5, 1927 |
| 2,097,216 | Schreurs | Oct. 26, 1937 |
| 2,193,777 | Jagmin | Mar. 12, 1940 |